United States Patent [19]

Hausberger et al.

[11] 4,021,313

[45] May 3, 1977

[54] METHOD FOR PURIFYING ACTINIDES WHICH ARE IN LOW OXIDATION STATES

[75] Inventors: Helmut Hausberger, Bad Schonborn; Hubert Goldacker; Helmut Schmieder, both of Karlsruhe, all of Germany

[73] Assignee: Gesellschaft fur Kernforschung m.b.H., Karlsruhe, Germany

[22] Filed: Oct. 20, 1975

[21] Appl. No.: 624,106

[30] Foreign Application Priority Data

Oct. 19, 1974 Germany .................. 2449590

[52] U.S. Cl. ................................. 204/1.5
[51] Int. Cl.² .............................. C25C 3/34
[58] Field of Search ........................ 204/1.5

[56] References Cited

UNITED STATES PATENTS

| | | | |
|---|---|---|---|
| 3,361,651 | 1/1968 | Parkinson et al. | 204/1.5 |
| 3,932,225 | 1/1976 | Bilal et al. | 204/1.5 |

*Primary Examiner*—Leland A. Sebastian
*Attorney, Agent, or Firm*—Spencer & Kaye

[57] ABSTRACT

A method is provided for purifying actinides which are present in a low oxidation state in aqueous solution. The actinides are purified of fission products by extracting the actinides from aqueous solution while confining the fission products to the aqueous solution. The actinides that are purified are selected from the group of uranium (IV), neptunium (IV) and plutonium (III). An aqueous nitric acid solution containing the actinides, hydrazine nitrate or hydroxyl ammonium nitrate, as well as fission products is initially subjected to an electrolysis voltage. If Pu (III) is involved, the electrolysis voltage is below the voltage at which oxygen develops at the anode and anodically oxidizes the Pu (III) to Pu (IV). The Pu (IV) which is formed is transferred by means of an organic extraction agent from the aqueous solution to an organic phase. The organic phase is then separated and used for the plutonium recovery process. If U (IV) and/or Np (IV) are involved, the aqueous nitric acid solution is initially subjected to an electrolysis voltage in the vicinity of the voltage at which oxygen develops at the anode or higher to anodically oxidize the U (IV) to U (VI) and the Np (IV) to Np (VI). The U (VI) and/or Np (VI) which is formed is transferred by means of an organic extraction agent from the aqueous phase to the organic phase. The organic phase is then separated and used for the uranium or neptunium recovery process.

17 Claims, 2 Drawing Figures

METHOD FOR PURIFYING ACTINIDES WHICH ARE IN LOW OXIDATION STATES

BACKGROUND OF THE INVENTION

The present invention relates to a method for purifying actinides present in a low oxidation state in an aqueous solution containing fission products, the actinides being from the group of uranium (IV), neptunium (IV) and plutonium (III), by extracting the actinides from the aqueous solution while keeping the fission products in the aqueous solution.

A method for purifying plutonium in 3 valence state is used, for example, in reprocessing processes of the PUREX type for spent nuclear fuel and/or breeder materials. To better clarify the multitude of sometimes complicated process steps in such a process, it is the custom to combine several process steps to so-called cycles at the ends of which the materials, such as uranium or plutonium, for example, are present in aqueous solution. The heart of the PUREX process, for example, after dissolving the spent nuclear fuel substance in an aqueous solution of nitric acid, comprises two extraction cycles. The first extraction cycle is a common extraction cycle in which uranium and plutonium are simultaneously separated from the aqueous solution containing the dissolved nuclear fuel and fission products into an organic extraction medium, such as, for example, tributyl phosphate (TBP). During this extraction there is a rough separation of the fission products which remain in the aqueous solution from the uranium and plutonium. The uranium and plutonium in the organic extract can then be transferred to separate aqueous stripping solutions and a second or fine extraction cycle for each of the uranium and the plutonium aqueous solutions can then be made with another organic extraction medium, which again can comprise TBP, to further purify these elements. Two extraction cycles utilizing, for example, tributyl phosphate (TBP) as the extraction agent are not sufficient, however, to produce high degrees of purity for either the uranium or the plutonium, and particularly, are not sufficient with respect to removing the fission products zirconium, niobium and ruthenium. Furthermore, with only two extraction cycles, the entire process is narrowly limited, particularly with respect to the extraction conditions or to the apparatus involved. For this reason, an additional or third solvent extraction cycle is sometimes introduced before the fine purification of the actinides to produce a further purification for uranium and plutonium. This third extraction cycle comprises separate extraction treatments on the two aqueous stripping streams which contain the uranium and plutonium, respectively.

It has also been proposed to use, instead of the two separate third extraction cycles for U and for Pu, a codecontamination cycle which takes place before the common extraction cycle and which would have the advantage of requiring very little in apparatus. It has also been proposed to us an anion exchange process or a sorption process instead of a third solvent extraction cycle to bring about further purification.

As stated above, in the common extraction cycle for separating the uranium and plutonium from the fission products, the nitric acid solution from the fuel suspension which contains the actinides and fission products is initially treated in an extraction process in which uranium and plutonium are transferred to the organic extraction agent and the majority of the fission products remain in the aqueous solution. The plutonium in the nitric acid solution has a valence state of 4 and passes into the organic phase with a valence state of 4. The organic phase is separated, scrubbed, and subjected to a re-extraction treatment selective for plutonium and in which uranium remains in the organic phase and the plutonium is separated from the uranium. This re-extraction treatment for selective extraction of plutonium, for example, can comprise an electrolytic reduction of the plutonium in the organic phase from the 4 valence state to a 3 valence state, and whereupon the Pu (III) can then be re-extracted to an aqueous phase with the aid of an aqueous hydrazine nitrate or hydroxyl ammonium nitrate solution. The aqueous phase containing the Pu (III) then is washed with an organic extraction agent solution to extract small quantities of uranium which has passed into the aqueous solution. The uranium is then re-extracted from the organic phase into an aqueous phase with diluted nitric acid.

Depending on whether a codecontamination cycle is introduced before the common U-Pu extraction and separation cycle, the plutonium in the prior art recovery processes after passing into the aqueous phase as Pu (III) from the organic extract, undergoes one further extraction cycle, if codecontamination was used or undergoes two further extraction cycles if codecontamination was not used, in order to further purify it and separate fission products and uranium which have been carried along and not previously removed. The known process for purifying the Pu (III) in the aqueous phase begins, after the above-described wash of the aqueous phase, by oxidizing the Pu (III) in the aqueous phase to Pu (IV). After oxidation, the Pu (IV) is extracted from the aqueous phase to an organic phase by using a TBP extractant. A considerable portion of the carried-along fission products, particularly zirconium and ruthenium, again remain in the aqueous phase. Thereafter, the organic phase containing the Pu (IV) is separated from the aqueous phase and washed. After separation and washing of the organic phase, the plutonium in the organic phase is again reduced to Pu (III) by means of electrolytic reduction and is re-extracted into an aqueous phase with a hydrazine nitrate solution or hydroxyl ammonium nitrate solution to complete the first Pu (III) purification cycle. In case no codecontamination cycle was used before the common U-Pu extraction cycle, a further Pu (III) purification cycle is performed by repeating the just-described steps.

The known processes for treating the spent nuclear fuels, as described above, have a number of drawbacks. For example, almost all of the valuable neptunium goes into the aqueous waste solutions together with the fission products during the various cycles. Loss of the neptunium occurs particularly during the common U-Pu extraction cycle, but also occurs during the purification cycles. Further, the systems are too complicated with respect to space requirements and expenses.

In addition, the process step of oxidizing the Pu (III) to Pu (IV) in the plutonium purification process results in further drawbacks. The previously employed oxidation of Pu (III) to Pu (IV) is effected by an addition of sodium nitrate ($NaNO_2$) or by the introduction of nitrogen dioxide ($NO_2$) or dinitrogen tetroxide ($N_2O_4$) to the aqueous solution containing the Pu (III) from the electrolytic reduction. Hydrazine nitrate is still present in this aqueous solution and is destroyed during the oxidation step, for example, according to the formula:

$$N_2O_4 + H_2O \rightleftharpoons HNO_3 + HNO_2$$

$$N_2H_5^+ + HNO_2 \rightarrow HN_3 + 2H_2O + H^+$$

or $$N_2H_4 + 2HNO_2 \rightarrow N_2 + N_2O + 3H_2O$$

When $N_2O_4$ is used, the oxidation of Pu (III) takes place according to the following formula $$Pu^{+3} + N_2O_4 \rightarrow Pu^{+4} + NO_2 + NO_2^-$$

In this prior art oxidation process, high excess quantities of $NaNO_2$ or $N_2O_4$ are required, for example, about ten times the stoichiometric quantity. The apparatus required for high throughputs is also considerable. The gas must be introduced in giant columns and the excess of oxidation agent must be removed in a subsequent stripping column by blowing in air. This leads to large quantities of contaminated exhaust gases. The costs for such a process are high. For example, the costs of the $N_2O_4$ alone can amount to about 200 to 250 dollars per ton of light water reactor fuel to be reprocessed.

It has been reported, by D. Cohen, JOURNAL OF INORGANIC AND NUCLEAR CHEMISTRY, Vol. 18, 1961, pages 107 to 210, that, in the course of tests to electrochemically display four valence states of plutonium in perchloric acid solutions, the electrolytic technique produces pure solutions of a given oxidation state and is particularly useful for the production of relatively concentrated (0.02 M) solutions of Pu (V). The recorded current-voltage curves in these tests indicate that Pu (III) can be oxidized to Pu (IV) in $HClO_4$ solution at a potential between −1.3 and −1.4 volt. The tests used to produce the current-voltage curves were conducted at 25° C and exclusively in 1 M $HClO_4$ solution. The literature does not show, however, that anodic oxidation of Pu (III) would be possible in a nonuniform aqueous nitric acid solution which is distinguished by the number and variety of its contents and their reactions, such as the aqueous nitric acid solutions that are found during the reprocessing of nuclear fuels and which contain various fission products and other components.

SUMMARY OF THE INVENTION

It is a primary object of the present invention to provide a generally applicable process for purifying actinides present in aqueous solutions contaminated particularly with fission products.

It is a further object of the present invention to provide such a process which avoids the drawbacks of the prior art processes and furthermore reduces the number of process steps in a reprocessing process for irradiated nuclear fuel and/or breeder materials.

Another object of the present invention is to provide a process which simplifies the neptunium recovery and makes it less expensive or eliminates the Np recovery from aqueous waste solutions.

A still further object of the present invention is to provide a process which improves the separation of plutonium from uranium and neptunium and permits direct and safe processing.

An additional object of the present invention is to provide a process in which the waste solutions from the process can be processed, in view of noncontaminating and nonpolluting removal, during solidification to as small as possible a quantity of solidified storable waste in simple and safe volume reduction processes.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purposes, the present invention, as embodied and broadly described, provides a method for purifying plutonium present in a low oxidation state of Pu (III), in an aqueous solution containing fission products and hydrazine nitrate or hydroxyl ammonium nitrate, by extracting the plutonium from the aqueous solution and confining the fission products to the aqueous solution. The method of the present invention comprises subjecting the aqueous solution to an electrolysis voltage below the voltage at which oxygen develops at the anode to anodically oxidize the Pu (III) to Pu (IV), transferring the Pu (IV) which has been formed by anodic oxidation from the aqueous solution to the organic phase by means of an organic extraction agent, separating the organic phase and using the separated organic phase for plutonium recovery.

In another respect of the invention, when the aqueous solution contains U (IV) and/or Np (IV), it is subjected first to an electrolysis voltage in the vicinity of the voltage at which oxygen develops at the anode to anodically oxidize the U (IV) to U (VI) and/or the Np (IV) to Np (VI), and in the second step the U (VI) and/or Np (VI) formed in the first step by anodic oxidation is transferred from the aqueous phase to an organic phase by means of an organic extraction agent, the organic phase is separated from the aqueous phase and used for uranium or neptunium recovery, respectively. In the present invention, simultaneously with the anodic oxidation of the actinides, hydrazine nitrate and hydroxyl ammonium nitrate in the aqueous solution are inevitably destroyed.

When the aqueous solution contains Pu (III), the density of the electrolysis current at the anode preferably is maintained below the density at which oxygen develops. In the case of anodic oxidation of uranium and/or neptunium, the current density at the anode preferably is raised above that at which oxygen develops.

The extraction into an organic phase following the anodic oxidation can be carried out in a conventional manner, and after separation from the aqueous phase, the recovery of the Pu, Np or U can be performed in a known manner.

It is to be understood that both the foregoing general description and the following detailed description are exemplary, but are not restrictive of the invention.

but the further oxidation to Pu (VI), as well as the oxidation of uranium (IV) to uranium (VI) or neptunium (IV) to neptunium (VI), can take place only with the addition of oxygen, e.g., $$Pu^{4+} + O_2 \rightarrow PuO_2^{2+} + 2e$$

Therefore, plutonium can be oxidized to Pu (IV) if anodic oxygen development is avoided. With a constant, suitably selected bath voltage (depending on the shape and size of the employed apparatus or the electrodes, respectively), or with constant potential, hydrazine and Pu (III) can be oxidized simultaneously. The process can take place with current densities at the anode between 1 and 10 mA/cm² anode surface. Theoretically, complete oxidation is attained for plutonium (III), assuming a 100% current yield, at about 26.8 ampere hours per mol Pu (III), and for hydrazine at about 107 A·H/mol. In practice, however, nitrate is simultaneously reduced to nitrate at the cathode which nitrite itself again undergoes a second reduction in which part of the hydrazine disposed in the vicinity of the cathod is reduced. In this way, a current yield of more than 100% results for the hydrazine oxidation. After destruction of the hydrazine nitrate and hydroxyl ammonium nitrate chemical reduction agents that are in the solution, part of the Pu (III) in the vicinity of the cathode is also oxidized to Pu (IV) autocatalytically.

The anodic oxidation of uranium (IV) and neptunium (IV) in nitric acid solutions or solutions containing hydrazine nitrate or hydroxyl ammonium nitrate takes place with simultaneous anodic oxygen development, i.e., at higher potentials or current densities, respectively.

Figure 1:
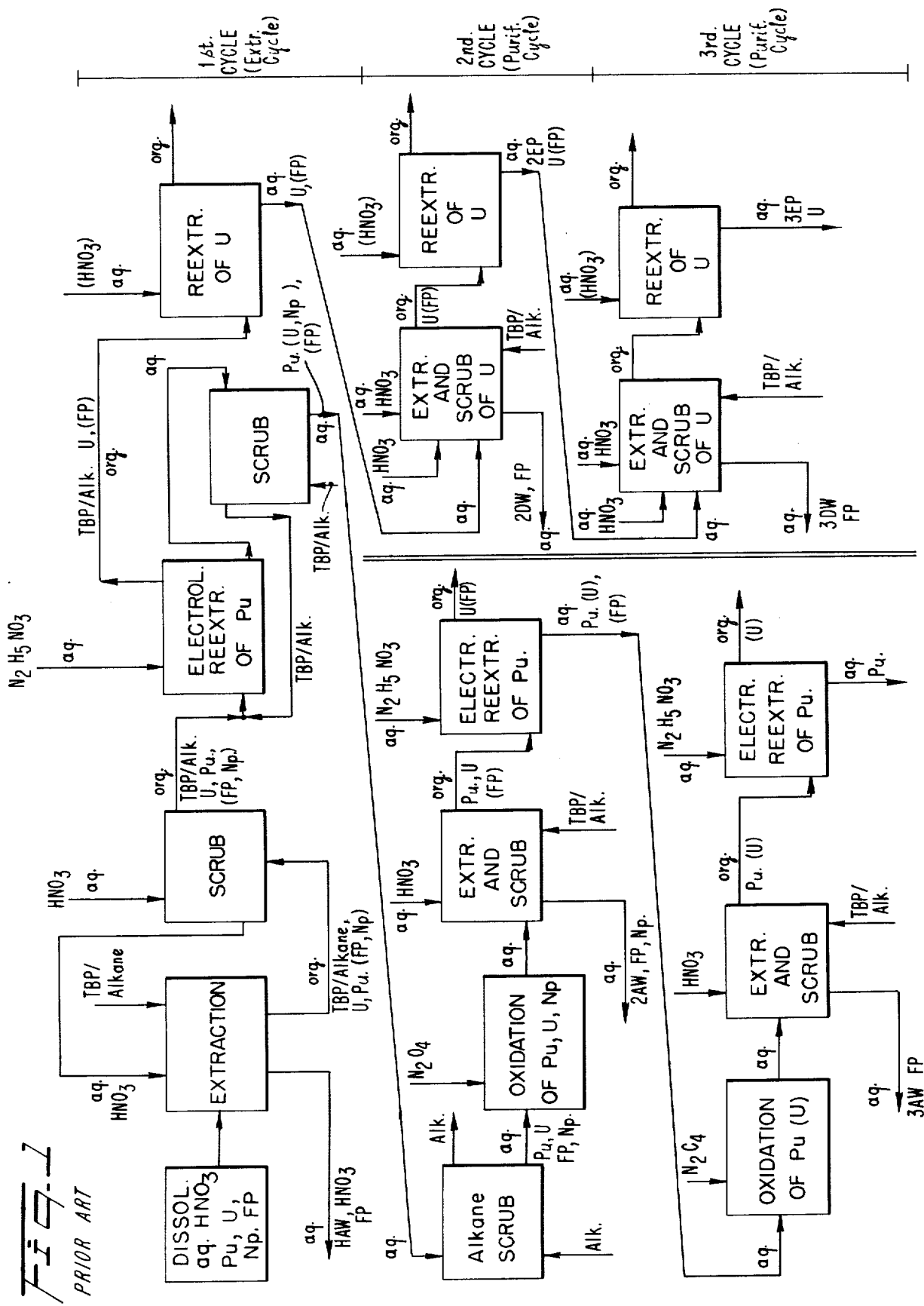
FIG. 1 is a flow sheet illustrating a typical prior art process for extraction of uranium and plutonium.

In the known process for extraction of uranium and plutonium in the first cycle (see FIG. 1) major amounts of neptunium go into the aqueous high radioactive waste solution (HAW) together with the fission products. Minor amounts of neptunium follow uranium and plutonium in the organic phase and were then reextracted together with plutonium in the step of electrolytical reduction and reextraction of plutonium from the organic phase into the aqueous phase. After chemical oxidation of plutonium (Pu(III) to Pu (IV)) in the second cycle (=first purification cycle) neptunium goes into the aqueous waste solution (2AW) together with the fission products whilst the plutonium is extracted into the organic phase.

In the process according to the invention however electrolytical oxidation is used to bring neptunium in a higher oxidation state which can be extracted together with uranium or together with uranium and plutonium by organophosphorus acid esters, and to avoid the transfer of neptunium into waste solutions. Hereby a special extraction cycle for the recovery of neptunium (in FIG. 1 not shown) from aqueous waste solutions such as HAW or 2AW is avoided. The process according to the invention simplifies therefore the neptunium recovery and makes it less expensive. The electrolytic reduction followed by the special electrolytic oxidation of plutonium on the one hand and by the electrolytic oxidation of uranium and neptunium on the other hand results an improvement in separation of plutonium from uranium and neptunium.

Figure 2:
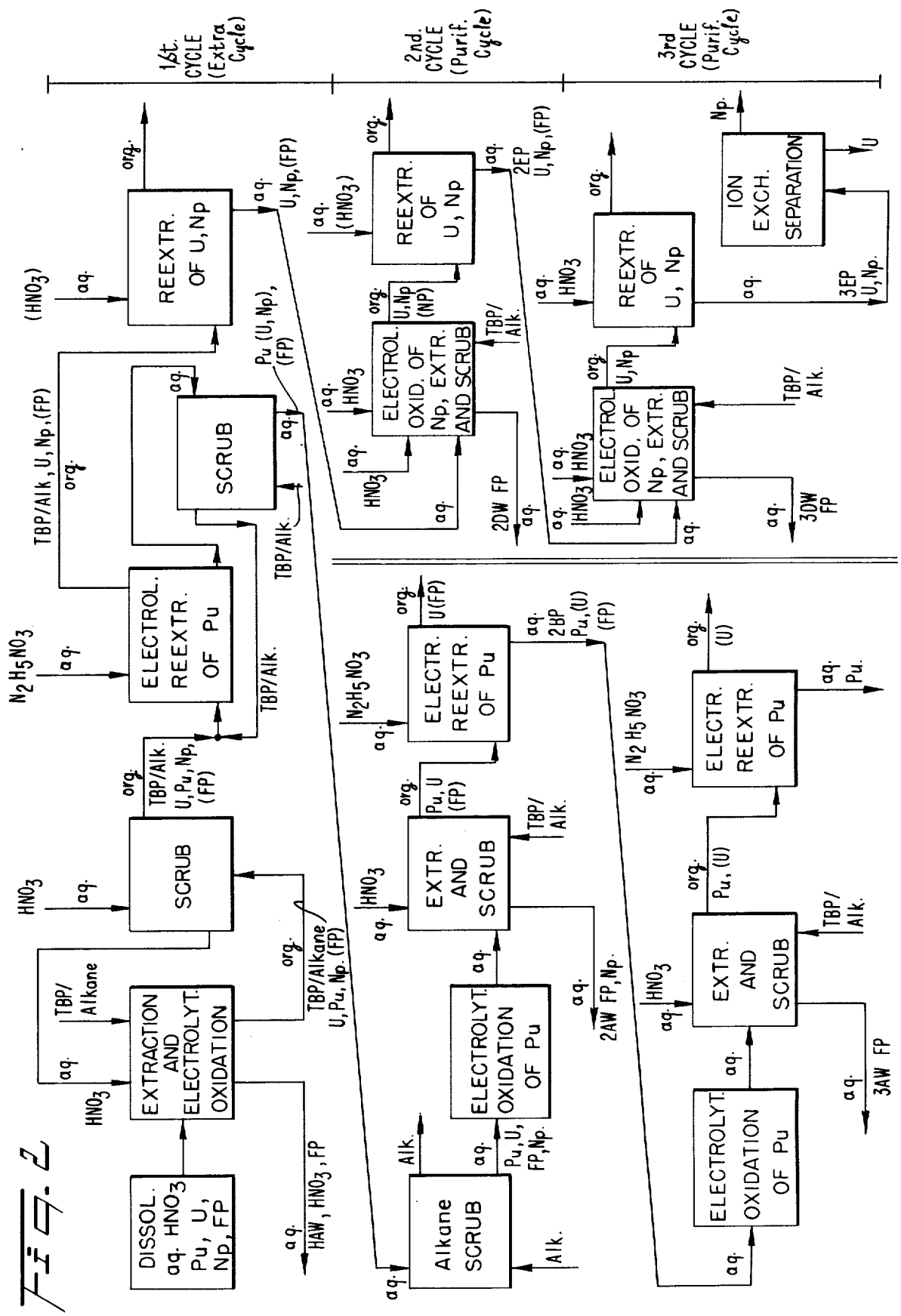
FIG. 2 is a flow sheet illustrating one embodiment of a process according to the teachings of the present invention. at the anode. The anode potential for the development of oxygen in nitric acid solutions, when platinum or platinized metals, such as, for example, platinized tantalum or platinized titanium are used, are almost one volt higher than the potential for the anodic oxidation of hydrazine or hydroxyl amine to nitrogen. The anodic oxidation of Pu (III) to Pu (IV) takes place according to the formula $$Pu^{3+} \rightarrow Pu^{4+} + e,$$

Neptunium transferred into the organic phase and reextracted together with uranium, both in the first cycle, can be oxidized in the second cycle or in the second and in the third cycle (see FIG. 2 as an example) and in every case then be separated from uranium in usual manner by a known ion-exchange process from the aqueous solution 3DW, which contains only a relative low concentration of fission products (FP), or from the aqueous product solution 3EP.

All extractions of the actinides from aqueous solutions into organic solutions are carried out in well known manner by using organophosphorus acid esters solutions such as tri-n-butylphosphate-dodecane solutions. The recovery from the organic extracts into aqueous solutions are likewise well known and are carried out by treating the organic extract with an aqueous hydrazine nitrate solution in the case of plutonium or with an very diluted aqueous HNO₃ solution (for example 0.01 M) in the case of uranium.

With regards to the apparatus used in the practice of the present invention, the preferred cathode and structural material for the electrolysis cells is titanium. However, other metals, such as, for example, Ta, Nb, platinized metals, and Aw, or graphite can also be used. A particularly suitable anode is platinum, or a platinized metal with passivation properties, such as, platinized Ta or platinized Ti. The electrolysis can be conducted in an electrolysis cell in which the aqueous solution is stationary or can be conducted in an electrolysis cell in which there is a flowthrough or continuous circulation of the solution. The electrolysis cell, whether it be of the stationary or flowthrough type, can be one which does not contain diaphragms or can be one which does contain diaphragms. the possibility of using diaphragms in the practice of the present invention exists because hydrazine nitrate or hydroxyl ammonium nitrate is also destroyed cathodically indirectly via primarily-formed nitrite.

The anodic oxidation can be effected in one or a plurality of series-connected electrolysis cells with or without diaphragms which are connected ahead of the extraction devices. Alternatively the anodic oxidation and the extraction of the actinides can be effected in extraction devices in which aqueous solutions and organic extraction agents continuously circulate in countercurrent flow.

A significant advantage of the process of the present invention is the drastic reduction of costs. As previously stated, the costs for the prior art N₂O₄ oxidation for two oxidations during the process sequence amount to about 200 to 250 dollars per ton of light water reactor (LWR) fuel. In contrast, the energy costs (current costs) for the anodic oxidation of the present invention comes to only two dollars and 50 cents per ton of LWR fuel. Additionally, the present invention has the advantage of a more direct and thus safer process sequence with the aid of electrical current, as well as the production of substantially reduced quantities of waste gas as compared to oxidation with N₂O₄. Further, the present invention produces a lower salt content in the waste solutions to be solidified as compared to the prior art oxidation with NaNO₂.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

This example illustrates the treatment of an aqueous feed solution containing plutonium (III) to bring about oxidation of the Pu (III) to Pu (IV).

The treatment is effected in an electrolytic cell apparatus which does not contain any diaphragms. The anode of the cell was made of platinum in the form of a network and had an area of about 42 $cm^2$. The cathode of the cell was made of titanium and had an area of about 8 $cm^2$. The bath voltage of the cell was constant at about 2.8 V. The current intensity of the cell was about 92 mA at the beginning of the test, and then dropped. The current density at the anode was about 2.2 $mA/cm^2$ maximum.

The aqueous feed solution serves an an electrolyte and has an initial composition which comprises 2.2 g of $Pu^{+3}$ per liter, 0.055 mol of $N_2H_5NO_3$ per liter, and 1.14 mols of $HNO_3$ per liter. The flow speed of electrolyte through the cell was about 0.5cm/minute.

After 3.5 Ah/l, corresponding to a current yield of about 130%, $N_2H_5NO_3$ could not be found in the electrolyte. After 8 Ah, the electrolyte solution contained less than 0.1 g of $Pu^{+3}$ per liter, more than 2.1 g of $Pu^{+4}$ per liter, and 1.08 mols per liter of $HNO_3$.

EXAMPLE 2

This example illustrates to the treatment of an aqueous feed solution containing U (IV) and the efficiency of oxidation of the U (IV) to U (VI).

The treatment is effected in an electrolytic cell apparatus which does not contain a diaphragm. The anode of the elctrolytic cell was a platinum foil having an area of about 2 × 100 $cm^2$. The curren density of the cell at the anode was approximately 1 $mA/cm^2$. The cathode of the cell was made of titanium and had an area of about 10 $cm^2$. The bath voltage in the cell was a constant 3.0 V, with current measurement through a 10 Ohm resistor. The current intensity in the cell was about 200 mA at the beginning of the test and about 60mA toward the end of the test.

The aqueous feed solution served as the electrolyte and contained 4.57 g of $U^{+4}$ per liter, 0.72 g of $UO_2^{++}$ per liter, 0.053 mol of $N_2H_5NO_3$ per liter, and 1.5 mols of $HNO_3$ per liter.

After about 4.5 hours, with the electrolyte in circulation, hydrazine could not be found in the electrolyte and at this time the uranium oxidaton started. After about 3.7 further hours, the uranium was present only in a $6^+$ valence state.

EXAMPLE 3

This example illustrates the treatment of an aqueous feed solution containing U (IV) and the efficiency of oxidation of the U (IV) to U (VI).

The treatment is effected in an electrolytic cell apparatus which does not contain a diaphragm and which is operated at a higher current density than that used in Example 2. The anode of the cell was made of platinum foil and had an area of 2 × 100 $cm^2$. The current density of the cell at the anode was about 4.5 $mA/cm^2$. The cathode of the cell was made of titanium and had an area of 10 $cm^2$. The current intensity in the cell was about 900 mA. The bath voltage in the cell was a constant 11.5 V, with current measurement through a 10 Ohm resistor.

The aqueous feed solution served as the electrolyte, was circulated through the cell, and contained in circulation 4.4 g of $U^{+4}$ per liter, 1.1 g of $UO_2^{++}$ per liter, 0.4 mol of $N_2H_5NO_3$ per liter, and 0.95 mol of $HNO_3$ per liter.

After five hours, the electrolyte solution contained only 1.1 g of $U^{+4}$ per liter, 4.4 g of $UO_2^{++}$ per liter, no $N_2H_5NO_3$, and 1.15 mol $HND_3$ per liter.

It will be understood that the above description of the present invention is susceptible to various modifications, changes and adaptations, and the same are intended to be comprehended within the meaning and range of equivalents of the appended claims.

What is claimed is:

1. A method for purifying plutonium present in a low oxidiation of Pu(III) in an aqueous solution containing fission products by extracting the plutonium from the aqueous solution and confining the fission products to the aqueous solution comprising: subjecting an aqueous nitric acid solution containing the Pu(III), hydrazine nitrate or hydroxyl ammonium nitrate, and fission products to an electrolysis voltage below the voltage at which oxygen develops at the anode to anodically oxidize the Pu(III) to Pu(IV), transferring the Pu(IV) which was formed by aniodic oxidation from the aqueous solution to an organic phase by means of an organic extraction agent separating the organic phase from the aqueous phase, and then using the separated organic phase in a plutonium recovery process.

2. Process as defined in claim 1 wherein the density of the electrolysis current at the anode is maintained below the density at which oxygen develops.

3. Process as defined in claim 1 wherein the anode material is platinum or a platinized metal with passivation properties and the cathode material is titanium.

4. Method as defined in claim 1 wherein the anodic oxidation takes place in one or a plurality of series-connected electrolysis cells without diaphragms, and said electrolysis cells are connected ahead of the extraction devices.

5. Process as defined in claim 1 wherein the anodic oxidation takes place in one or a plurality of series-connected electrolysis cells provided with diaphragms.

6. Process as defined in claim 1 wherein the anodic oxidation and the extraction of the plutonium takes place in an extraction device in which the aqueous solution and organic extraction agent circulate continusously in countercurrent flow.

7. Method as defined in claim 1 wherein together with the anodic oxidation of the Pu(III), hydrazine nitrate and hydroxyl ammonium nitrate in the aqueous solution are positively destroyed.

8. The method as defined in claim 1, wherein said aqueous nitrate acid solution that is subjected to the electrolysis voltage is obtained by selectively extracting plutonium from an organic phase containing uranium.

9. The method as defined in claim 8, wherein said uranium-containing organic phase further contains neptunium.

10. The method as defined in claim 9, wherein said uranium and neptunium-containing organic phase contains fission products and, further comprising the steps of:

i. after the selective extraction of the plutonium, transferring the uranium and neptunium to an aqueous nitric acid solution along with fission products, with the uranium and neptunium being present therein in a low oxidation state of U(IV) and Np(IV);

ii. subjecting said uranium and neptunium-containing nitric acid solution to an electrolysis voltage of about the voltage at which oxygen develops at the anode or higher to anodically oxidize the U(IV) to U(VI) and the Np(IV) to Np(VI);

iii. transferring the U(VI) and/or Np(VI) formed in step (ii) from the aqueous nitric acid solution to an organic phase by means of an organic extraction agent; and iv. separating the organic phase formed in step (iii) from the aqueous nitric acid solution of step (iii).

11. A method for purifying actinides present in low oxidation states and selected from the group of uranium (IV), neptunium (IV) and mixtures thereof, said actinides being present in an aqueous solution containing fission products, by extracting the actinides from the aqueous solutions and confining the fission products to the aqueous solution, comprising subjecting a nitric acid solution containing the actinides, hydrazine nitrate or hydroxyl ammonium nitrate, and fission products to an electrolysis voltage of about the voltage at which oxygen develops at the anode or higher to anodically oxidize the U(IV) to U(VI) and the Np(IV) to Np(VI), transferring the U(VI) and/or Np(VI) formed by the anodic oxidation from the aqueous phase to an organic phase by means of an organic extraction agent, separating the organic phase from the aqueous phase, and then using the separated organic phase in a uranium or neptunium recovery process.

12. Process as defined in claim 11 wherein the density of the electrolysis current at the anode is maintained above that at which oxygen is formed.

13. Process as defined in claim 11 wherein the anode material is platinum or a platinized metal with passivation properties and the cathode material is titanium.

14. Method as defined in claim 11 wherein the anodic oxidation takes place in one or a plurality of series-connected electrolysis cells without diaphragms, and said electrolysis cells are connected ahead of the extraction devices.

15. Process as defined in claim 11 wherein the anodic oxidation takes place in one or a plurality of series-connected electrolysis cells provided with diaphragms.

16. Process as defined in claim 11 wherein the anodic oxidation and the extraction of the actinides takes place in extraction devices in which aqueous solution and organic extraction agent circulate continuously in countercurrent flow.

17. Method as defined in claim 11 wherein together with the anodic oxidation of the actinides, hydrazine nitrate and hydroxyl ammonium nitrate in the aqueous solution are positively destroyed.

* * * * *